(12) United States Patent
Ismert et al.

(10) Patent No.: US 7,398,227 B2
(45) Date of Patent: Jul. 8, 2008

(54) METHODS, SYSTEMS, AND COMPUTER FOR MANAGING PURCHASING DATA

(75) Inventors: Ryan M. Ismert, Eugene, OR (US);
Justin M. Cook, Brookline, MA (US);
Gregory T. Woods, Beverly, MA (US);
Adam M. Rosen, Somerville, MA (US)

(73) Assignee: CGI-AMS Inc., Fairfax, VA (US)

( * ) Notice: Subject to any disclaimer, the term of this patent is extended or adjusted under 35 U.S.C. 154(b) by 1010 days.

(21) Appl. No.: 09/741,884

(22) Filed: Dec. 22, 2000

(65) Prior Publication Data

US 2004/0078275 A1  Apr. 22, 2004

(51) Int. Cl.
*G06Q 30/00* (2006.01)
*G06F 17/30* (2006.01)

(52) U.S. Cl. .......................................... 705/26; 705/27
(58) Field of Classification Search ................... 705/25, 705/26–27
See application file for complete search history.

(56) References Cited

U.S. PATENT DOCUMENTS

| 6,196,458 B1* | 3/2001 | Walker et al. ............... 235/380 |
| 2002/0010686 A1* | 1/2002 | Whitesage ................... 705/80 |
| 2003/0105682 A1* | 6/2003 | Dicker et al. ................. 705/27 |

OTHER PUBLICATIONS

"Web Marketplace To Bring Close-Out Industry Online—Startup To Match Buyers And Sellers Of Discounted Overstock, Overruns, And Mislabeled Goods, (Internet/Web/Online Service Information)," Wilder, Clinton, InformationWeek, p. 98, Oct. 25, 1999.*

* cited by examiner

*Primary Examiner*—Matthew S. Gart
(74) *Attorney, Agent, or Firm*—Finnegan, Henderson, Farabow, Garrett and Dunner, LLP

(57) ABSTRACT

Systems and methods consistent with the present invention manage the purchasing data of purchasing entities. The systems and methods can efficiently and automatically analyze the purchasing activity of the entities to prepare information used to form and operate purchasing consortiums. The system receives purchasing data from a purchasing entity. The purchasing data relates to purchase transactions for a plurality of products purchased by the purchasing entity. After receiving the purchasing data, the system identifies, for each transaction, a product related to the transaction by comparing the received purchasing data with product information stored in a product index. The product information in the index associates at least a portion of the received purchasing data with a particular product. The system then modifies the received purchasing data to include data representing the identified product and processes the modified purchasing data to reflect all purchase transactions concerning the identified product. The processed information can then be used, for example, by a manager of a consortium.

67 Claims, 8 Drawing Sheets

FIG. 7A

| Category | Group: | Information Technology | | Total Spending: | $33,032,700 |
|---|---|---|---|---|---|
| | Class: | Telecom | | Companies: | 5 |
| | Unit: | Equipment | | GL Accounts: | 132 |
| | | | | Suppliers: | 6 |

| TOP SUPPLIERS | Entity A | Entity B | Entity C | Entity D | Entity E | Category Spend | Total Spend |
|---|---|---|---|---|---|---|---|
| Supplier 1 | $388,272 | $70,743 | $28,267,539 | $36,663 | $112,614 | $28,875,831 | $28,875,831 |
| Supplier 2 | $1,474,714 | $0 | | | $0 | $1,474,714 | $1,474,714 |
| Supplier 3 | $0 | $413,803 | $76,236 | | $594,575 | $1,084,613 | $1,084,613 |
| Supplier 4 | $0 | $636,160 | | | $0 | $636,160 | $6,534,002 |
| Supplier 5 | $90,165 | $50,565 | $0 | $78,474 | $10,967 | $230,171 | $230,171 |
| Supplier 6 | $0 | $0 | $0 | $12,420 | $0 | $12,420 | $12,982,744 |
| VIEWED TOTAL | $1,953,151 | $1,171,271 | $28,343,775 | $127,557 | $718,156 | $32,313,909 | $51,182,075 |

| Entities | Category Spend | | Overall Spend |
|---|---|---|---|
| C | $28,343,775 | out of | $402,078,594 |
| A | $1,953,151 | out of | $1,843,517,239 |
| B | $1,171,271 | out of | $676,038,559 |
| E | $718,156 | out of | $1,069,702,847 |
| D | $127,557 | out of | $2,037,918,562 |

| Top GL Accounts | Category Spend | | Overall Spend |
|---|---|---|---|
| Charge to | $10,580,425 | out of | $11,465,014 |
| Outside services | $7,158,750 | out of | $23,290,759 |
| Rent | $5,126,536 | out of | $20,533,013 |
| SW Product-Royalties | $4,695,081 | out of | $4,695,081 |
| Construction in Progress | $989,476 | out of | $157,013,863 |
| Five Year Property | $773,111 | out of | $14,804,902 |
| Machine Rental | $486,407 | out of | $9,166,613 |
| Telephone expense | $484,280 | out of | $14,299,886 |
| Accrd. Expenses (other) | $305,786 | out of | $305,786 |
| Inventory - new equip. | $207,500 | out of | $60,103,770 |
| Viewed Total: | $30,807,351 | out of | $315,678,686 |

FIG. 7B

Company A
$1,088,790

| Category | Group: | Marketing |
| | Class: | Research |
| | Unit: | n/a |

Totals Box

| | |
|---|---|
| Total Spend | $1,088,790 |
| Cost Center Count | 36 |
| GL Account Count | 2 |
| Supplier Count | 6 |

Top Suppliers - Common

| Supplier | Company Category Spend | vs. | Total Spend | Portfolio Category Spend | vs. | Total Spend |
|---|---|---|---|---|---|---|
| SUPPLIER A | $84,120 | vs. | $84,120 | $219,353 | vs. | $219,353 |
| Viewed totals | $84,120 | vs. | $84,120 | $219,353 | vs. | $219,353 |

Spending Analysis

| | | |
|---|---|---|
| Total Spend: | | $1,088,790 |
| Common Spend: | | $84,120 |
| Unique Spend: | | $1,004,670 |
| % Common Spend: | | 8% |
| % Unique Spend: | | 92% |
| Rank in Portfolio | | 2 |
| % of Portfolio Spend | | 25% |

Top Suppliers - Unique

| | Category Spend | | Overall Spend |
|---|---|---|---|
| SUPPLIER Q | $105,000 | vs. | $225,980 |
| SUPPLIER R | $70,709 | vs. | $107,282 |
| SUPPLIER S | $1,500 | vs. | $272,218 |
| SUPPLIER T | $704 | vs. | $2,111 |
| SUPPLIER U | $326 | vs. | $365,546 |
| Viewed totals | $178,239 | vs. | $973,117 |

Top GL Accounts

| | Category Spend | | Overall Spend |
|---|---|---|---|
| Marketing Research | $739,690 | vs. | $1,720,577 |
| Facilities rent expense | $349,100 | vs. | $57,969,784 |
| Viewed totals | $1,088,790 | vs. | $59,690,362 |

Top Cost Centers

| | Category Spend | | Overall Spend |
|---|---|---|---|
| 2710 MIDWEST | $524 | vs. | $290,136 |
| 5610 SOUTHEAST | $830 | vs. | $332,180 |
| 708312 CENTRAL | $2,920 | vs. | $407,715 |
| 221S13 CENTRAL | $35,342 | vs. | $35,342 |
| 222S13 CENTRAL | $49,086 | vs. | $49,086 |
| Viewed totals | $88,702 | vs. | $1,114,459 |

METHODS, SYSTEMS, AND COMPUTER FOR MANAGING PURCHASING DATA

BACKGROUND OF THE INVENTION

1. Field of the Invention

The present invention relates generally to systems and methods for managing purchasing data, and more particularly, to methods and systems for managing purchasing data of a plurality of entities in order to facilitate the creation and operation of purchasing consortiums.

2. Description of the Related Art

Purchasing consortiums make it possible to achieve better prices on purchased goods and services on behalf of the member entities of the consortium, such as individual companies or organizations, through volume negotiating and buying. However, to successfully form and operate a purchasing consortium, it is important to have an accurate picture of the purchasing needs of the member entities.

Specifically, data obtained with respect to the member entities should include the total amount spent by each entity in the consortium, the quality and types of purchases made by each entity, and the suppliers from whom each entity purchases goods or services. All of the data from the individual entities must be compiled into a portfolio, which contains valuable information about the purchasing activities of the consortium as a whole. This data includes the total amount spent by the consortium members on each type of good or service, as well as the degree of supplier concentration among member entities.

Most companies and organizations have a vast amount of valuable purchasing data in their back-office systems. However, this data is often difficult to access, because the systems in which the data resides were designed for other purposes. Even if it were possible to easily extract this data, analysis of the purchasing data of the member entities would remain difficult, due to the thousands of ways those entities structure their data and categorize their purchases. Even within a single entity itself, each department may structure this purchasing data differently.

Further, some of the purchasing data may be incomplete, or may contain inaccurate or incorrectly entered information. In this case, even if the data can be extracted, it would be difficult to determine which entities use the same products as well as the same suppliers of those products. If the consortium cannot determine matching products and suppliers amongst the member entities, then the consortium cannot successfully utilize its volume leverage to obtain better prices for its members.

Thus, in order to facilitate the creation and operation of a purchasing consortium, there is a need for a system that can obtain purchasing data from a variety of member entities (as well as the departments within those entities) and organize that data so as to clearly display what products and services are purchased by the member entities and from whom these products and services are purchased. Further, there is a need for such a system to be able to analyze the purchasing data to obtain information used to negotiate better prices on products and services purchased by member entities of the consortium.

SUMMARY OF THE INVENTION

Systems and methods consistent with the present invention manage the purchasing data of purchasing entities. The systems and methods can efficiently and automatically analyze the purchasing activity of the entities to prepare information used to form and operate purchasing consortiums.

Specifically, systems and methods consistent with the present invention receive purchasing data from a purchasing entity. The purchasing data relates to purchase transactions for a plurality of products purchased by the purchasing entity. After receiving the purchasing data, the system identifies, for each transaction, a product related to the transaction by comparing the received purchasing data with product information stored in a product index. The product information in the index associates at least a portion of the received purchasing data with a particular product. The system then modifies the received purchasing data to include data representing the identified product and processes the modified purchasing data to reflect all purchase transactions concerning the identified product.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed. Further features and/or variations may be provided in addition to those set forth herein. For example, the present invention may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, illustrate one embodiment of the invention and together with the description, serve to explain the principles of the invention. In the drawings:

FIG. 7A is an exemplary report, consistent with reports generated by the system; and FIG. 7B is an alternate exemplary report, consistent with reports generated by the system.

DESCRIPTION OF THE PREFERRED EMBODIMENTS

Overview

Systems and methods consistent with the present invention manage purchasing data from entities belonging to a purchasing consortium. The system receives from each member entity purchasing data that describes all purchase transactions made by that entity. Typically, this purchasing data describes the supplier and product associated with each transaction, the amount spent on each transaction, as well as other accounting information relating to the transaction. After formatting the raw purchasing data received from the member entities, the system processes the formatted data based on predefined supplier and product databases to identify the particular supplier and product associated with each transaction. The system then uses the processed data, complete with identified purchase transaction information, to manage, monitor, and measure the purchasing activity of each entity belonging to the consortium. Accordingly, a manager of the consortium can use this data to negotiate better prices for products from suppliers by leveraging the buying power of the member entities.

While the description of the invention refers to purchasing data for products, systems consistent with the present invention may manage purchasing data for any type transaction. More specifically, the term "product" refers to any type of product, good, service, or commodity. Further, the term "entity" may refer to any type of organization, company, or individual. Finally, while the system is preferably used by a purchasing consortium, the system may also be used for process the purchasing data of a single entity.

System Implementation

Figure 1:
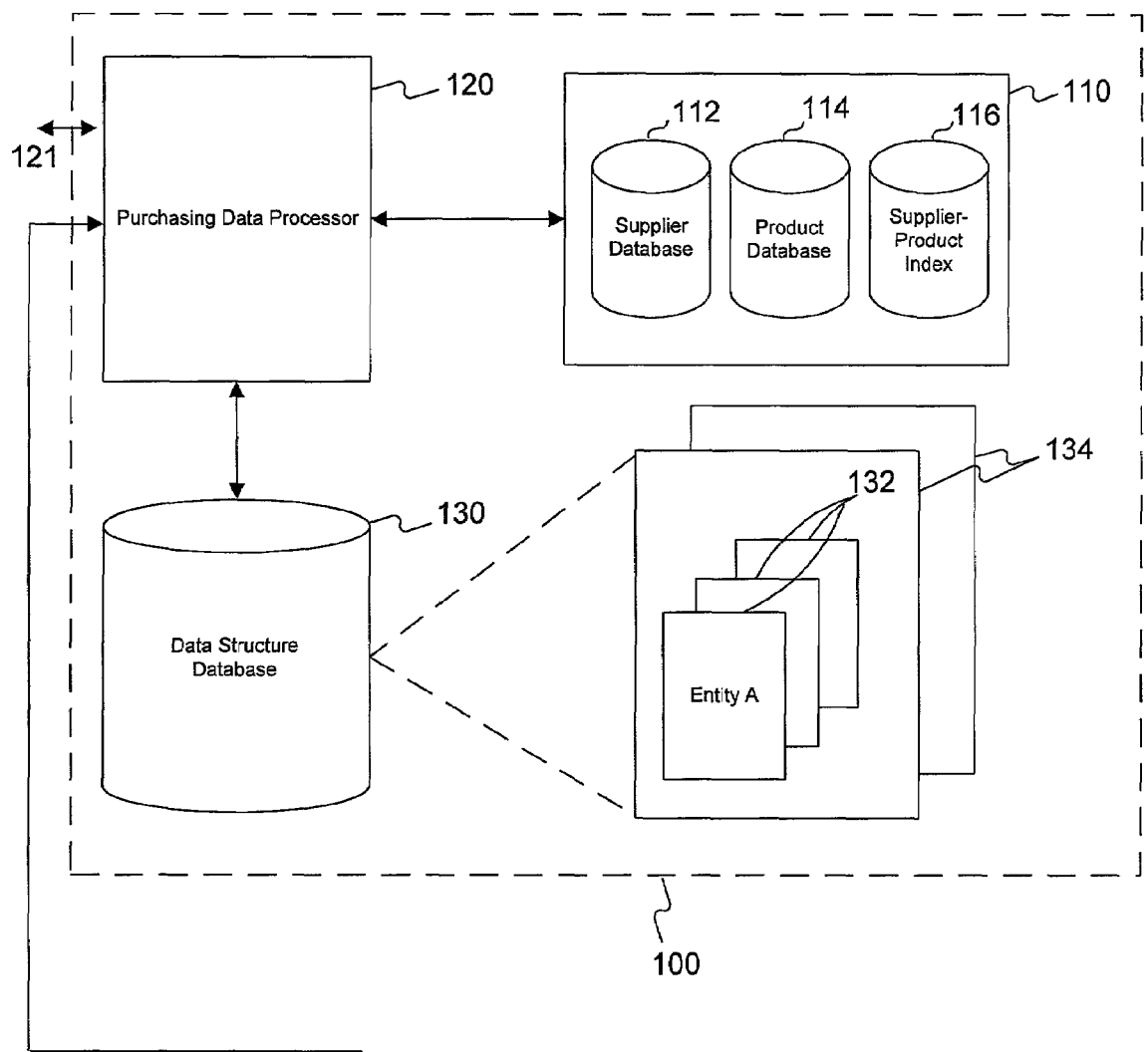
FIG. 1 illustrates a block diagram of a purchasing management system consistent with the present invention.

FIG. 1 illustrates a purchasing data management system 100 consistent with the present invention. As shown in FIG. 1, system 100 includes a local system database 110, a purchasing data processor 120, and a data structure database 130. System 100 preferably communicates with a central database 150 which stores information used by system 100 to analyze the received purchasing data. System 100 may be implemented using either a personal computer, workstation, network computer, or mainframe computer.

Processor 120 receives purchasing data from the member entities over a data link 121, via, for example, a keyboard, a disk drive, a CD-ROM, a network link, or a modem. The received purchasing data preferably includes information on a number of purchasing transactions made by the member entity. For each transaction, this information typically includes information describing: (1) the products purchased by a member entity; (2) the suppliers from whom the products were purchased; (3) the general ledger account associated with each transaction; (4) the cost center associated with each transaction; and (5) the amount spent on each purchase. The general ledger account indicates how the member entity classified the transaction according to its accounting procedures. The cost center refers to the department within the member entity associated with the particular transaction.

The received purchasing data often contains incomplete or inaccurate information about the supplier and/or product concerning each purchase transaction. For example, the received data may simply identify a supplier by an acronym or a nickname, or may contain an incorrect phone number or address of the supplier. The same may also be true for the portion of the received information concerning the purchased product. To identify the actual supplier and product associated with each purchase transaction, system 100 heuristically analyzes the received purchasing data.

As described in greater detail below, processor 120 formats the received purchasing data and stores the formatted data in data structure database 130. System 100 then processes the formatted purchasing data to identify the supplier and product associated with each transaction based on the supplier and product information stored in database 110. After identifying the suppliers and products, processor 120 can process the data stored in database 130 to produce reports detailing the purchasing activity of the entities and of the consortium.

Database 130 stores the received purchasing data in predefined data fields. In particular, database 130 includes an entity-level data structure 132 for each entity in the consortium, as well as data structures 134 for the consortium as a whole. The entity-level data structure 132 preferably includes a data field for the products purchased by the entity, a data field for the suppliers of those products, a data field for the amount spent on each transaction, a data field for the general ledger account associated with each transaction, and a data field for the cost center associated with each transaction, as well as information about the member entity itself.

The consortium-level data structure 134 contains compiled data on the information stored in its associated entity-level data structures 132. Basically, the consortium data structure 134 contains aggregate information about the purchasing activities of all member entities in the consortium. This information includes the overall spending of the consortium, the degree of supplier concentration (indicating the extent to which member entities purchase products from the same supplier), as well as other data concerning the purchasing activity of the consortium.

Local system database 110 stores information used by system 100 to accurately identify the supplier and product associated with each transaction based on the information stored in data structure 132. As shown in FIG. 1, local system database 110 further includes a supplier database 112, a product database 114, and a product index 116. While FIG. 1 shows databases 112 and 114, and index 116 as separate units, the information stored therein may also be stored in a single database.

Supplier database 112 stores information identifying the various suppliers normally used by the member entities. For example, database 112 may store each supplier's name, address, phone number, and fax number. Database 112 also stores a supplier identification code assigned by system 100 to each supplier. Product database 114, on the other hand, includes a listing of the products normally purchased from the suppliers listed in database 112. For example, database 114 may correspond to the United Nations Standard Product and Service Classification (UNSPSC), which is a hierarchical classification of various products and services. The product index 116 contains information used by system 100 to associate products in database 114 with information included in the received purchasing data.

Processor 120 then compares the information in the entity-level data structures 132 with the information stored in local system database 110 to identify, for each transaction, the particular supplier and product associated with that transaction. In particular, for each transaction, processor 120 compares the supplier information stored in data structure 132 with the supplier identification information stored in database 112. Based on this comparison, processor 120 identifies the particular supplier associated with each transaction. Similarly, processor 120 identifies the particular product associated with each transaction by accessing index 116 to determine what products correspond to the purchase transactions included in the received purchasing data.

Index 116 preferably includes a number of indices that define which products in database 114 correspond to particular transactions. For example, index 116 may include a table indicating what products of database 114 are sold by suppliers in database 112. In this case, system 100 matches the supplier of the transaction with a set of likely product classifications. Index 116 may also include, however, an index defining the products in database 114 that correspond to a given United States Standard Industry Code (SIC). Thus, when the received purchasing data includes an SIC code for a particular transaction, system 100 may access index 116 to determine the product associated with that SIC code. Index 116 may include a table of key words that may be included in the purchasing data and which are associated with a particular product in database 114. If one of these key words is included in the purchasing data, then system 100 can determine what product corresponds to the received data. Other indices may also be used to indicate products based on other purchasing data, such as general ledger account or cost center. Finally, the term "index" means any type of index, table, catalog, or storage device that contains data used for associating product information with any information included in the received purchasing data, and may only include data that assists with such product association.

Index 116 also includes a weight value representing the likelihood that a particular product is actually associated with a particular transaction. A weight value is assigned to each product for each type of index. Thus, the weight value indicates the likelihood that a product is correctly identified by the corresponding index. The weight value may also depend upon the member entity providing the purchasing data. In systems consistent with the present invention, these weight values are determined based on previous product associations determined by system 100 and/or predefined criteria entered by a user of system 100.

For example, Telecommunications Company A may provide local phone service, cellular phone service, and cellular telephones. Based on previous product associations determined by system 100, index 116 may define that when Telecommunications Company A is the supplier, the products will have the following weights (e.g., on a scale of 1 to 20):

local phone service (weight=4);

cellular phone service (weight=20); and cellular telephones (weight=7).

Thus, the high weight value for cellular phone service indicates that a purchasing transaction involving Telecommunications Company A likely involves cellular phone service.

In addition to data structure database 130, processor 120 may store the processed purchasing data in central database 150. In this embodiment, database 150 stores the identified information from each transaction. Central database 150 may store the processed purchasing data in data structures similar to those of data structures 132 and 134. In either case, the processed purchasing data is preferably stored using multi-dimensional data cubes, which are well known in the art. These data cubes store data corresponding to summarized data of data structures 132 and 134. Thus, when system 100 prepares reports summarizing the purchasing activity of the consortium, system 100 accesses the data cube corresponding to, for example, spending by product type, by supplier, by the consortium, or by a member entity. System 100 or central database 150 may store information using other data storage techniques, however.

Central database 150 may also store the information contained in supplier database 112, product database 114, and product index 116. In particular, central database 150 may retain this information for data security purposes and then download the required information to local database 110 of system 100 on an as-needed basis. In this case, central database 150 may store information for a number of consortiums and download only that information associated with the consortium for which system 100 is managing purchasing data. Central database 150 may then update the supplier and product information stored in database 110 based on information learned from the management of other consortiums.

System Operation

Figure 2:
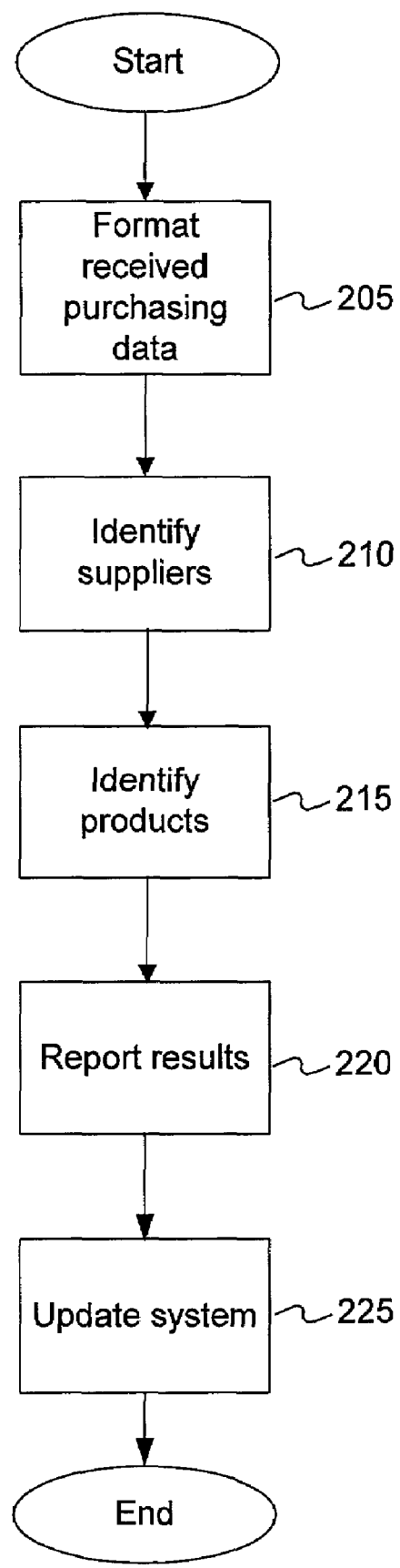
FIG. 2 is an exemplary flow chart of a method for managing and adding value to purchasing data.

FIG. 2 is an exemplary flowchart of a method for managing the purchasing data received from the member entities participating in the purchasing consortium. As shown in FIG. 2, system 100 first receives the purchasing data and stores it in data structure database 130 (step 205). More specifically, processor 120 formats the purchasing data from a member entity and stores it in a corresponding entity-level data structure 132. System 100 repeats this operation for purchasing data received from each member entity.

System 100 then identifies the supplier associated with each purchasing transaction (step 210). Because of the thousands of ways that the member entities often structure their purchasing data, as well as the various acronyms and nicknames that they may assign to any given supplier, accurately identifying the supplier associated with a transaction is a difficult and arduous task. Accordingly, system 100 implements a heuristic supplier identification process that uses the information in the supplier data field of data structure 132 and the supplier and product information of database 110. This supplier identification process is described in greater detail with respect to FIG. 4. The identified supplier information is then stored in data structure 132.

After identifying the supplier, system 100 then identifies the product associated with each transaction (step 215). In particular, system 100 compares the data stored in data structure 132 with the product information stored in database 114 and index 116. As described in greater detail below with respect to FIG. 5, system 100 may identify the product based on information in index 116. For instance, index 116 identifies those products that likely correspond to a particular supplier, general ledger account, or cost center described in the received purchasing data. As with the supplier identification process, system 100 implements a heuristic identification process to identify the products and stores the identified product information in data structure 132.

Though steps 205 to 215, system 100 creates data structures 132 and 134 describing the purchase transactions of the member entities and the consortium. System 100 can then manipulate or processes the data in these data structures 132 and 134 to prepare reports summarizing the purchasing activity of the member entities and the consortium (step 220). To this end, system 100 summarizes the processed data stored in data structure 132, which, from the above identification procedures, includes accurate supplier and product information, as well as other transaction information associated with each purchase.

FIGS. 7A and 7B, illustrate exemplary reports of the purchasing activity of a consortium and a member entity, respectively. System 100 may output these reports using, for example, traditional paper-based reporting methods, interactive reporting methods, and/or web-based reporting methods. As shown in FIG. 7A, a consortium-level report lists the most commonly used suppliers for a given type of purchase, and the amount spent by each entity for each supplier. The consortium-level report may contain, for each purchased product, the following information: (1) the total amount spent by the consortium; (2) the total amount spent by supplier; (3) the total amount spent by each member entity for particular account categories; (4) the degree of supplier concentration among the member entities by account category (not shown in FIG. 7A); and (5) the top internal departments and ledger accounts associated with each transaction in each account category. Other information may be reported, based on the needs of the consortium manager.

FIG. 7B illustrates an exemplary report of the purchasing activities of a particular member entity. For example, the report in FIG. 7B shows how much money a particular member entity spent on market research, the most popular general ledger accounts for purchases made in this area, and the most common suppliers used by the entity in this area. System 100 can also generate reports that track spending by a member entity before and after it joins the consortium. Further, the consortium may use system 100 to provide a set of normalized suppliers to a member entity to assist the member entity in cleaning up their own back office databases.

The generated reports assist either system 100 or a consortium manager to negotiate better prices for the member entities. In particular, because system 100 automatically collects and analyzes the purchasing data received from the member entities, system 100 itself or the consortium manager can efficiently measure the purchasing activity of the consortium on a daily basis. The purchasing activity reported by system 100 provides information used to better leverage the buying volume of the consortium entities and thus to obtain better prices. Further, system 100 can identify particular suppliers from whom the member entities frequently purchase products. Accordingly, system 100 or the consortium manager can collectively negotiate for the member entities, rather than the entities doing so independently.

Returning to FIG. 2, system 100 then updates database 110 using the supplier and product identification results obtained from steps 210 and 215 (step 225). System 100 updates database 112 with new information that system 100 obtains about suppliers during the supplier recognition process of step 210. System 100 also updates index 116, based on the identification results, to account for more accurate associations between products and purchase transaction information. The updating of system 100 is described in greater detail below with respect to FIG. 6.

Figure 3:
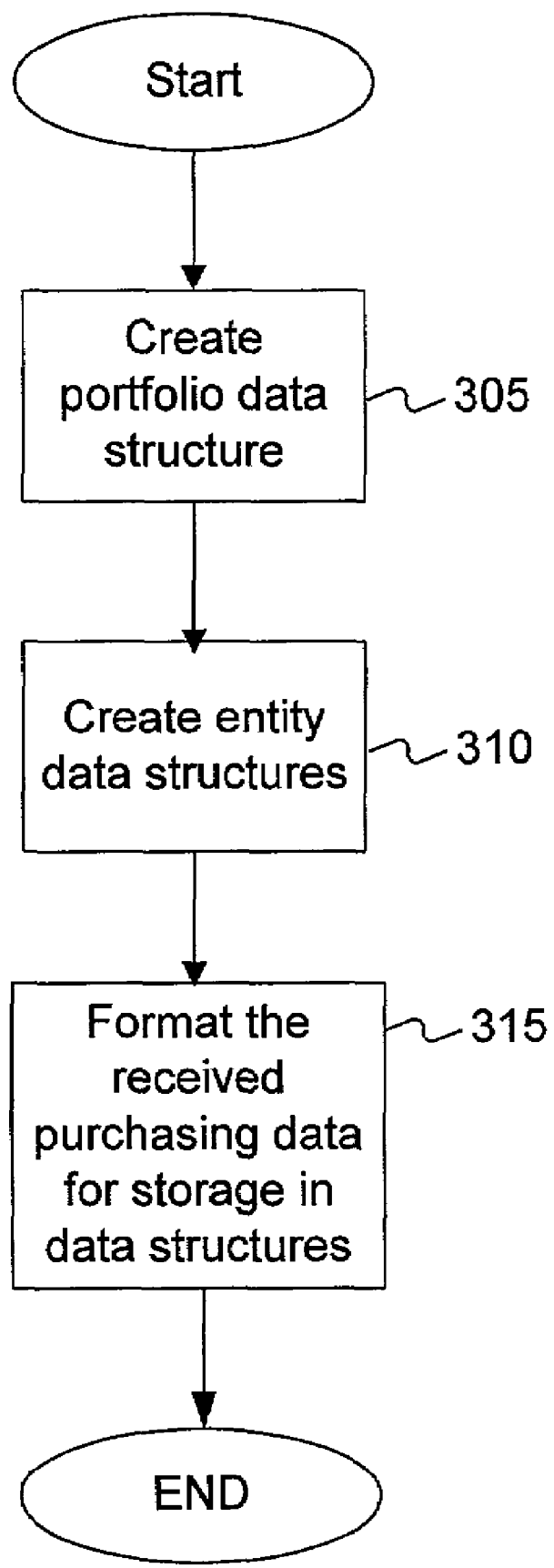
FIG. 3 is an exemplary flowchart illustrating the step of receiving purchasing data.

FIG. 3 shows a flowchart illustrating a method for implementing step 210 of FIG. 2. First, processor 120 creates a consortium-level data structure 134 (step 305). The created consortium-level data structure 134 includes an entry for the name of the consortium, as well as other data fields for storing data summarizing the purchasing activity of the consortium.

Processor 120 then creates entity-level data structures 132 for each member entity associated with the consortium-level data structure 134 (step 310). Besides the various data fields described above for storing the appropriate information included in the purchasing data received from the member entity, entity-level data structures 132 may also include criteria describing the data that system 100 expects to receive from the member entities. For example, this information may include a date range applicable to the data received from the respective entity. As described below, system 100 may use this information to confirm the integrity of the received purchasing data.

After system 100 creates the data structures, data processor 120 formats the received purchasing data and stores the corresponding portions of the received data in the respective data fields of structures 132 and 134 (step 315). Although formatting the received data prior to processing is optional, system 100 may increase the accuracy of the subsequent supplier and product identification steps by formatting the data.

To format the received data, processor 120 first determines whether the received data complies with the format of data structures 132 and 134. To this end, system 100 ensures that certain data fields are not left blank, and, in such cases, may not store the received data. System 100 also truncates or transforms any entered data to comply with any storage or format requirements of data structure 132. Additional formatting ensures that no duplicate or offsetting transactions are contained in the received data. Some further examples of formatting include removing any trailing notations in the supplier's name (such as Inc., L.L.P., Co., or Ltd.), compressing nine digit zip codes by removal of dashes, and removing parentheses and dashes from phone and fax numbers.

To ensure the integrity of the received purchasing data, system 100 determines that the received data complies with predefined criteria included in data structure 132 that defines the type of data expected to be received from a member entity. For example, system 100 may confirm that the received data is for transactions from a time frame expected for the member entity. In addition, system 100 may determine whether the received data reflects an appropriate distribution of purchases for the entity over a given time frame (e.g., whether spending over the time period falls within preset dollar limits).

Figure 4:
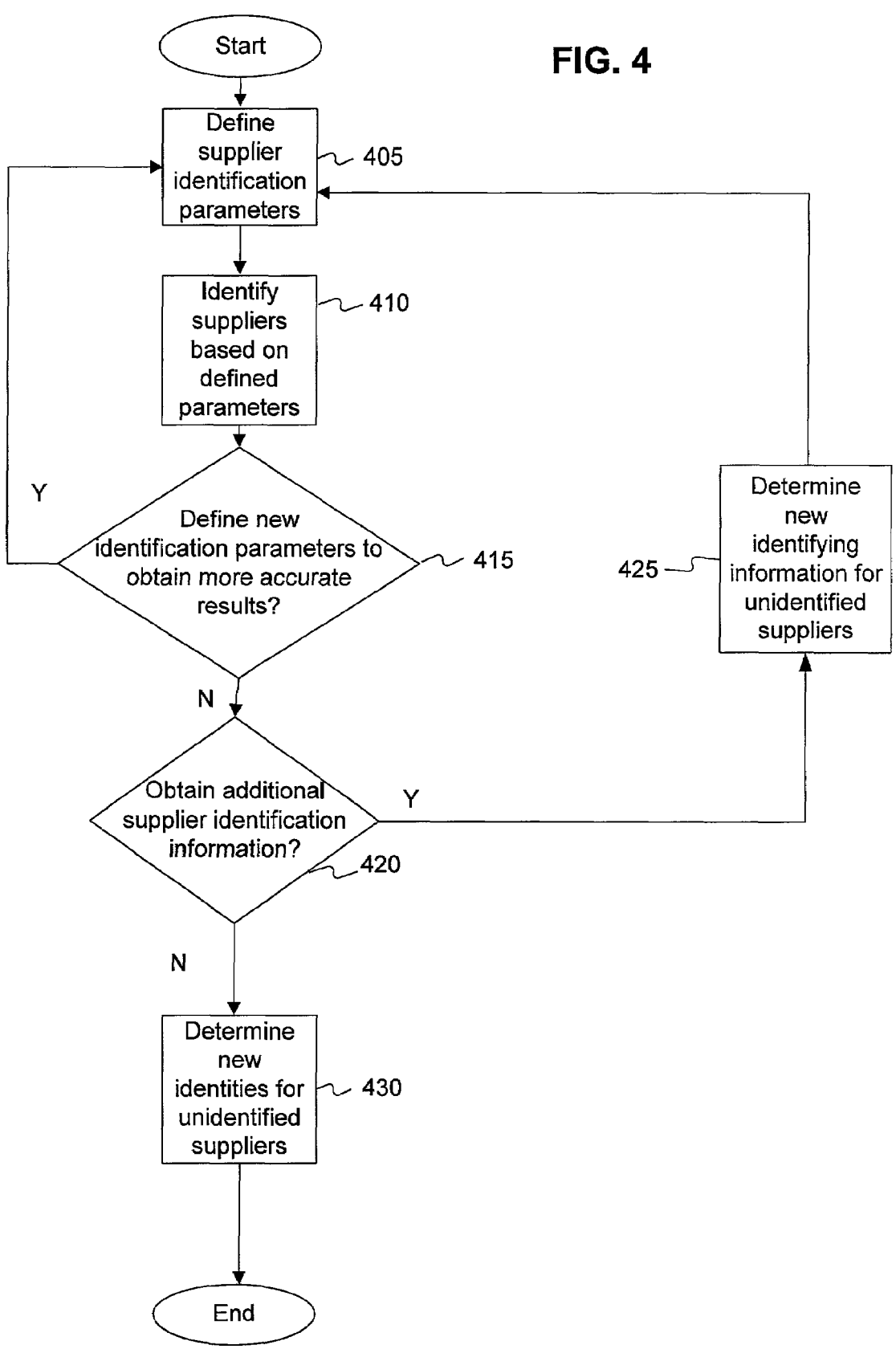
FIG. 4 is an exemplary flowchart illustrating the step of identifying suppliers.

FIG. 4 shows a flow chart of a method consistent with the present invention for implementing the supplier identification step 215 of FIG. 2. As shown in FIG. 4, the method first defines the parameters used by system 100 to identify a supplier (step 405). Each supplier identification parameter defines a rule for identifying a supplier based on a comparison of the supplier information in data structure 132 with the supplier information in database 112. Some exemplary identification parameters include: (1) matching supplier name exactly; (2) matching the first 15 characters of supplier name; (3) matching the first 50% of characters of the supplier name; (4) comparing acronyms formed from the supplier name; (5) matching the first one or two words of the supplier name; (6) matching supplier addresses or parts thereof, such as city, zip code, or first 5 digits of zip code; (7) comparing the supplier full phone or fax number, or parts of the supplier phone or fax number, such as the first 6 digits; or (8) comparing the supplier DUNS number. System 100 may also use other supplier identification parameters, which, for instance, may be developed by evaluating the parameter's effectiveness in identifying suppliers.

System 100 may identify suppliers using one or more of these parameters. For example, system 100 may require that parameters (2), (5), and (6) be satisfied before determining that the supplier has been accurately identified. System 100 then applies the defined identification parameters to the received data (step 410). In particular, a supplier is identified when a comparison of the supplier information in data structure 132 with that in database 112 meets the defined identification parameter(s). If a combination of parameters are defined, then system 100 may either require that all parameters be satisfied or require that only one parameter be satisfied in order to identify a supplier. Identified suppliers in data structure 132 are then assigned the supplier identification code associated with the respective supplier information stored in supplier database 112. Once the supplier is identified, system 100 assigns that supplier's identification code stored in database 112 to the supplier information of data structure 132.

System 100 next determines whether to define additional identification parameters to further evaluate the suppliers identified by step 410 (step 415). System 100 makes this determination based on the likelihood that more suppliers may be identified by altering the identification parameters or that additional parameters may further refine the initial results. For example, system 100 may substitute a more basic identification parameter to obtain more results, or may add an additional parameter to refine the obtained results. If additional parameters are identified, system 100 defines those parameters that the results must meet, and processing returns to step 405. If system 100 determines that additional identification parameters will not yield better results (such as when even a basic identification parameter does not yield any useful results), then system 100 determines whether it should obtain additional supplier information to assist in identifying the supplier (step 420).

In particular, system 100 will obtain additional information when it determines that information not included in entity-level data structure 132 can be obtained from other sources. System 100 may obtain additional information by matching information of the unidentified suppliers with information in an external database (not shown) (step 425). For example, system 100 may access a commercial database containing supplier information, which system 100 can then use to supplement the supplier data received from the member entity and stored in data structure 132 (e.g., it may provide alternative information, such as a different phone number or address). In this case, system 100 adds the additional information to the received data stored in data structure 132, and then the processing returns to step 405.

When system 100 has identified all possible suppliers, new identities are determined for any supplier that could not be determined through steps 405-425 (step 430). System 100 then assigns a supplier identification code to the newly identified supplier in data structure 132 and stores the supplier and corresponding identification code in database 112. If system 100 identifies more than one supplier by the process of FIG. 4, then system 100 will display each of those suppliers to a user who can then select the appropriate one. Alternatively, system 100 may automatically select the appropriate supplier based on predefined criteria describing the likelihood that a particular supplier is associated with a particular type of purchase transaction and/or member entity. In either event, once the supplier has been identified, system 100 modifies data structure 132 to reflect the identified supplier.

Figure 5:
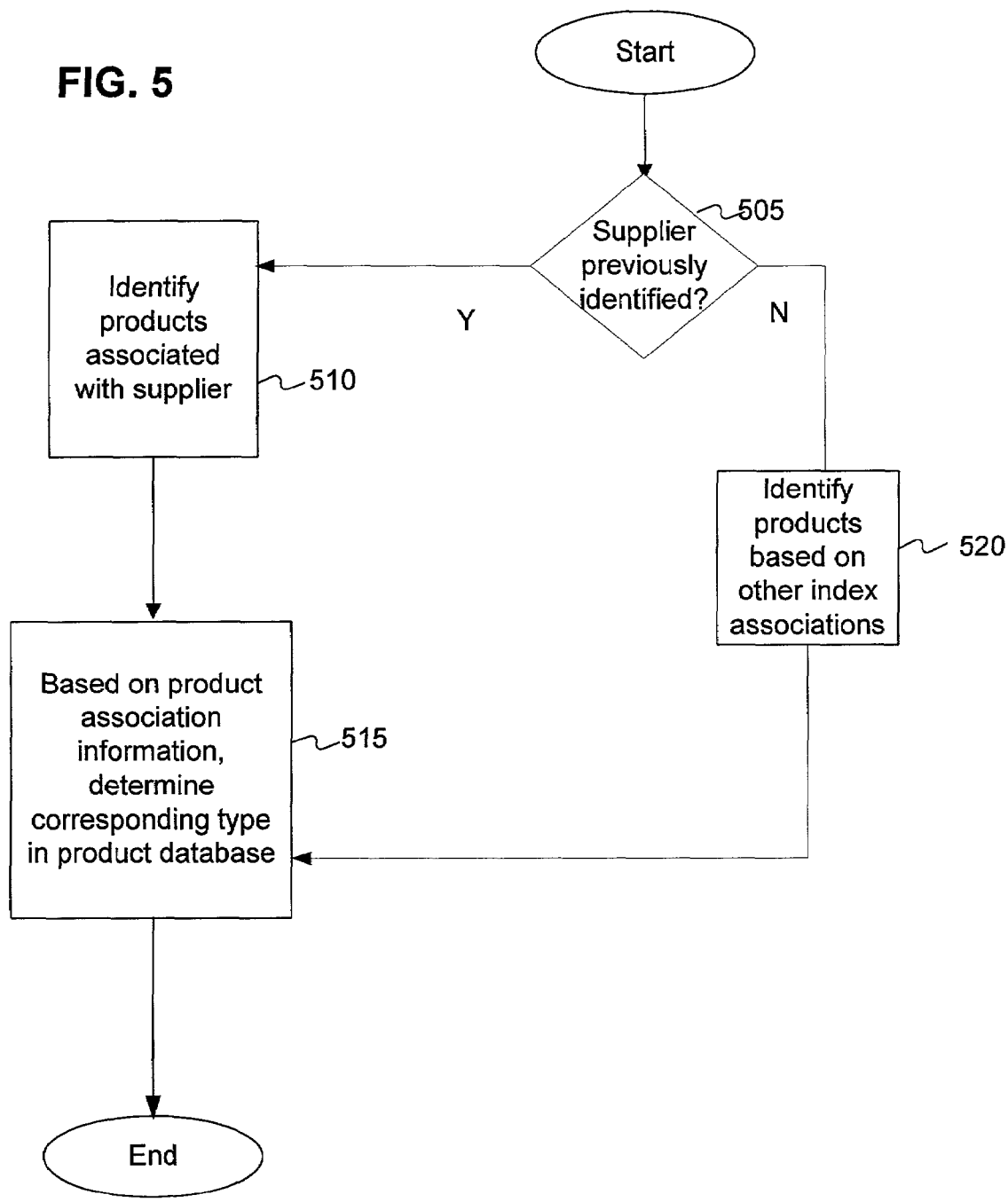
FIG. 5 is an exemplary flowchart illustrating the step of identifying product data associations.

FIG. 5 shows a flow chart of a method consistent with the present invention for implementing the product identification step 220 of FIG. 2. To identify a product, system 100 uses information from the transaction, such as the supplier, ledger account, cost center, or purchase description. As shown in FIG. 5, system 100 first determines whether the identified supplier of the particular transaction is listed in index 116 (step 505). If so, then system 100 accesses index 116 to determine the products associated with that supplier (step 510). From these products, system 100 selects the product having the highest weight value associated with the particular member entity (step 515).

For suppliers not identified in index 116, system 100 determines the product based on other index associations (step 520). For example, system 100 may determine if the purchasing data received from the member entity includes an SIC number. If so, processor 120 accesses the particular index stored in index 116 that correlates SIC numbers to products in database 114.

System 100 may also access a key word index stored in index 116 that correlates key words contained in the supplier name to products in database 114. For example, if index 116 does not associate any products with the supplier "Joe's Screw Widgets," then the words "Joe's," "Screw," and "Widgets" can be compared to entries in the key words table. This could then result in the determination that Joe's Screw Widgets could sell the products "Screw" or "Widget." System 100 could then select one of these products based on the weight values assigned to each of them. In addition to the supplier name, system 100 may also perform a key word search using an index correlating key words found in general ledger data, purchase or product descriptions, cost centers, or additional purchasing data with particular products.

After identifying products in database 114 based on index 116, processing proceeds to step 515 where system 100 selects the product having the highest weight value. Preferably, system 100 identifies products using a number of indexes of index 116, such that, for each transaction, system 100 compiles all of the identified products and combines (e.g., sums) the weights corresponding to the different indexes. System 100 then selects the product having the highest combined weight value. The combined weight value may be determined by summing the different weight values, or by some other calculation to arrive at a combined weight value.

With respect to generating a key word table, one possible method is as follows. First, system 100 gathers a list of all single words in the product database 114, along with its classification association. System 100 then finds all exact matches of these words that fall within a lower level of the same classification hierarchy. For a greatly simplified example, if system 100 determines that "red" appears in the classification VEHICLES:CARS:SPORTSCAR, and "red" appears in the classification VEHICLES:CARS:SEDAN, then "red" would be added to the key word table, along with an association to the lowest level at which it can be resolved (in this case VEHICLES:CARS). Conversely, take the word "mouse". If the word "mouse" appears in the classification HOUSEHOLD ITEMS:PEST CONTROL:TRAPS:RODENTS and the word "mouse" appears in COMPUTERS: INPUT DEVICES, then there is no lower level on which the term can be resolved, and it is not added to the key word table. After formation of the table, system 100 checks to see if any of the added words have been explicitly deleted and therefore removes those words.

Although step 520 of FIG. 5 was described using a number of indexes 116, methods and systems consistent with the present invention may use only a single index stored in index 116. Further, as opposed to automatically selecting a product, system 100 may display each identified product to a user, who may then select the appropriate product. Once the product has been identified, system 100 modifies data structure 132 to reflect the identified product.

To further refine the process for identifying a product, system 100 may use more than one product identification criteria. For example, product identification based on supplier information alone, may yield a list of possible product results ranked by their corresponding weight values. By adding an additional parameter to the identification criteria, however, processor 120 can obtain more refined results. Additional product identification parameters include general ledger, cost center, and entity information. For example, if Supplier A is determined to be associated with Widget A, Widget B, and Widget C, the cost center parameter can then be added. With this new parameter, system 100 may determine that Widget C is the only product associated with Supplier A at Cost Center 1, thus improving the accuracy of the identified product.

Updating of system 100, as in step 230 of FIG. 2, can encompass a variety of different activities. For instance, system 100 updates supplier information 112 with the new supplier information included in the purchasing data received from the member entities. System 100 also updates the table of key words in index 116 based on changes to the product database 114. System 100 may also determine that particular identification parameters more accurately identify suppliers or products, in which case, the parameters can be ranked based on their level of accuracy. Similarly, product indexes 116 and their respective weight values can be updated based on the new results of system 100.

Updating the efficiency of supplier identification parameters permits system 100 to recommend sets of identification parameters for use during step 405 of FIG. 4. Using all of the purchasing data stored in the central database 150, for instance, system 100 can apply a predetermined set of parameter combinations to identify suppliers. System 100 then compares these suppliers to those identified during the operation of system 100 with respect to a particular member entity. True positives, true negatives, false positives, and false negatives are assessed, and the efficiency of each set of parameter combinations is determined. Based on the determined efficiency, the most efficient parameters are recommended by system 100.

Figure 6:
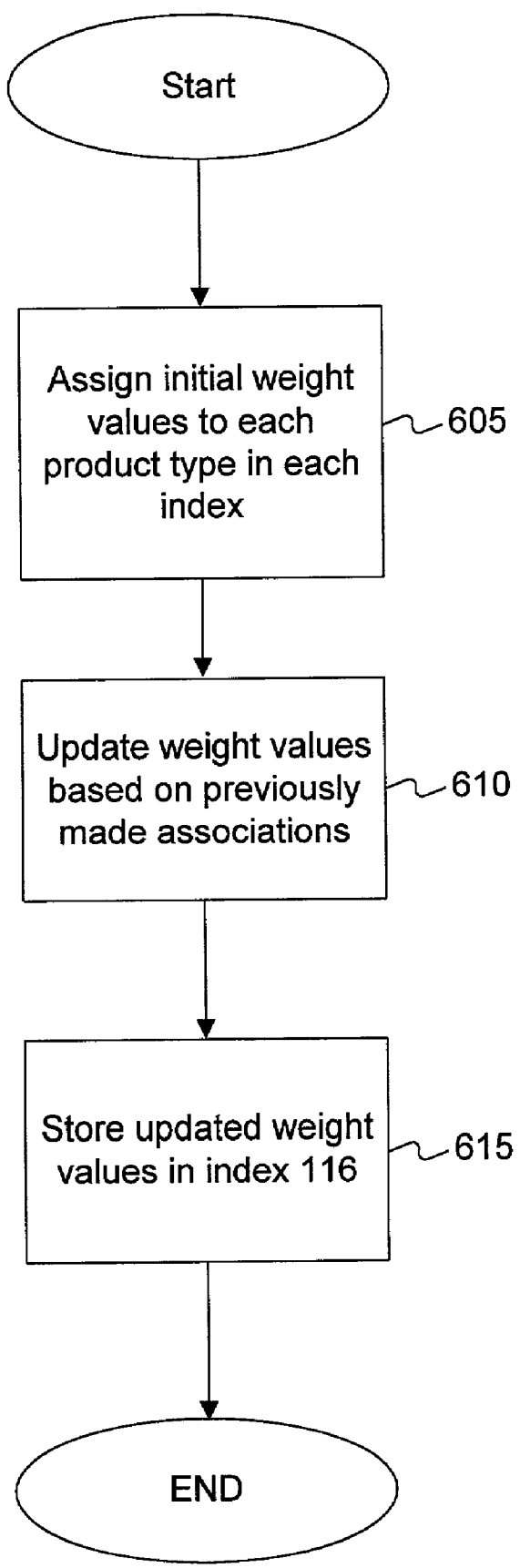
FIG. 6 is an exemplary flow chart illustrating one embodiment of the step of updating the system.

FIG. 6 is a flow chart illustrating a method for updating the product indices and respective weight values of index 116. After resetting all previously determined weights, system 100 determines a new weight value for each product type in each index of index 116 (step 605). In other words, each product in each index is assigned a standard weight value. Each index, however, may have a different standard weight value depending upon how well that index determines products based on the information in the received purchasing data. For example, system 100 may assign a high standard weight value to products in the supplier-to-product index (which gives a more reliable determination of the product), a medium standard weight value in the SIC-to-product index, and a low standard weight value in the key word-to-product index (which gives a less reliable determination of the product).

System 100 then looks at the final product associations made using each index, and determines a new weight value for each product based on the relative accuracy of the particular association (step 610). In particular, for each product in each index, system 100 sums the number of times that the product was eventually identified using that index. System 100 then combines (e.g., multiplies) that number by the standard weight value for that index. The newly updated weight values are then ranked and then stored in index 116 (step 615).

CONCLUSION

As discussed above, systems and methods consistent with the present invention manage purchasing data received from entities in a purchasing consortium. The system and method automatically identifies suppliers and products referred to in the received purchasing data. The system then reports the resulting categorized data for use in creating and operating the consortium or for use by the member entity.

The above-noted features and other aspects and principles of the present invention may be implemented in various system or network environments to provide automated computational tools for receiving purchasing data, identifying suppliers, and organizing data, reporting organized data, storing associations extracted from the organized data, and administering stored data. Such environments and applications may be specifically constructed for performing various processes and operations of the invention or they may include a general purpose computer or computing platform selectively activated or reconfigured by program code to provide the necessary functionality. The processes disclosed herein are not inherently related to any particular computer or apparatus, and may be implemented by a suitable combination of hardware, software, and/or firmware. For example, various general purpose machines may be used with programs written in accordance with the teachings of the invention, or it may be more convenient to construct a specialized apparatus or system to perform the required methods and techniques. The present invention also relates to computer readable media that include program instruction or program code for performing various computer-implemented operations based on the methods and processes of the invention. The media and program instructions may be those specifically designed and constructed for the purposes of the invention, or they may be of the kind of well-known and available to those having skill in the computer software arts. Examples of program instructions include both machine code, such as produced by a compiler, and files containing a high level code that can be executed by the computer using an interpreter.

Other modifications and embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for processing purchasing data, the method comprising:
   receiving purchasing data, from a purchasing entity that is a member of a purchasing group, wherein the purchasing data relates to accounting data associated with purchase transactions made by the purchasing entity;
   creating a data structure to store the received purchasing data, including creating a first data structure for entity-level purchasing data and creating a second data structure for group-level purchasing data related to the purchasing group;
   using a computer to identify, for each transaction, a product related to the transaction by comparing the received purchasing data with product information stored in a product index, wherein the product information in the product index associates at least a portion of the received purchasing data with a particular product;
   modifying the received purchasing data in the data structure to include data representing the identified product; and
   processing the modified purchasing data to reflect all purchase transactions concerning the identified product.

2. The method of claim 1, wherein the receiving step further includes:
   determining whether the received purchasing data complies with predetermined purchasing data criteria defining data expected from the purchasing entity.

3. The method of claim 1, wherein the receiving step further includes:
   formatting the received purchasing data to comply with predetermined data storage requirements.

4. The method of claim 1, wherein the product index further includes a weight value for each association of a particular product to a portion of the received purchasing data, wherein each weight value defines a relative accuracy of the corresponding association, and wherein the product identifying step further includes:
   determining, from the product index, products associated with a portion of the received purchasing data; and
   identifying the product related to the transaction based on the weight values of the products determined from the product index.

5. The method of claim 4, wherein the step of identifying the product based on the weight values further includes:
   identifying the product related to the transaction by selecting the product having the highest weight value.

6. The method of claim 4, wherein the method includes:
   updating the weight values based on an accuracy determination of the corresponding associations.

7. The method of claim 1, wherein the product identifying step further includes:
   comparing the received purchasing data with product information stored in a plurality of product indexes, wherein each product index associates different portions of the received purchasing data with products; and identifying the product related to the transaction based on the comparisons with the product information in each of the plurality of product indexes.

8. The method of claim 7, wherein each of the product indexes includes a weight value for each association of a particular product to a portion of the received purchasing data, wherein each weight value defines a relative accuracy of the corresponding association, and wherein the identifying step further includes:

determining, from the product indexes, products associated with a portion of the received purchasing data; and identifying the product related to the transaction based on the weight values of the products determined from the product indexes.

9. The method of claim 8, wherein the step of identifying the product based on the weight values further includes:

combining the weight values for each determined product from each product index; and identifying the product related to the transaction by selecting the product having the highest combined weight value.

10. The method of claim 1, further comprising:

identifying, for each transaction, a supplier associated with the particular transaction;

modifying the received purchasing data to include data representing the identified supplier; and processing the modified purchasing data to reflect all purchase transactions concerning the identified supplier.

11. The method of claim 10, wherein the step of identifying a supplier includes:

identifying, for each transaction, a supplier associated with the transaction by comparing the received purchasing data with supplier identification information stored in a supplier database.

12. The method of claim 11, wherein the method further includes:

updating the supplier database with new supplier identification information about suppliers contained in the received purchasing data.

13. The method of claim 11, wherein the supplier identifying step further includes:

comparing the received purchasing data with supplier identification information to determine a match based on at least one of the following matching criteria: (1) an exact match between a portion of the received purchasing data with the supplier identification information; or (2) a match of a predetermined portion of the received purchasing data with the supplier identification information.

14. The method of claim 13, wherein the step of comparing the purchasing data includes determining a match based on at least one of the following supplier matching criteria: (1) a name of a supplier; (2) an acronym formed from a supplier's name; (3) an address or a portion of an address of a supplier; (4) a telephone or facsimile number of a supplier; or (5) an identification number assigned to a supplier.

15. The method of claim 14, wherein a plurality of the supplier matching criteria may be used to determine a match.

16. The method of claim 10, wherein the step of identifying a supplier further includes:

assigning a supplier identification code corresponding to the identified supplier of each transaction; and wherein the step of processing the modified purchasing data further includes the substep of sorting the transactions according to the assigned supplier identification code.

17. The method of claim 1, wherein the step of processing the modified purchasing data further includes:

analyzing the modified purchasing data to summarize purchasing activity of the purchasing entity.

18. The method of claim 1, wherein the product index associates products with information on suppliers included in the received purchasing data.

19. The method of claim 1, wherein the product index associates products with textual information included in the received purchasing data.

20. The method of claim 1, wherein the product index associates products with an identification code included in the received purchasing data.

21. The method of claim 1, wherein the method includes the step of:

negotiating for purchases based on the processed modified purchasing data.

22. A computer for processing purchasing data, the computer comprising:

a memory having program instructions stored thereon; and a processor, responsive to the program instructions, configured to:

receive purchasing data, from a purchasing entity that is a member of a purchasing group, wherein the purchasing data relates to accounting data associated with purchase transactions purchased by the purchasing entity, wherein the received purchasing data does not include data identifying each product corresponding to each transaction;

create a first data structure for entity-level purchasing data and a second data structure for group-level purchasing data related to the purchasing group;

identify, for each transaction, a product related to the transaction by comparing the received purchasing data with product information stored in a product index;

modify the received purchasing data in the data structure to include data representing the identified product; and process the modified purchasing data to reflect all purchase transactions concerning the identified product.

23. The computer of claim 22, wherein the processor is further configured to:

determine whether the received purchasing data complies with predetermined purchasing data criteria defining data expected from the purchasing entity.

24. The computer of claim 22, wherein the processor is further configured to:

format the received purchasing data to comply with predetermined data storage requirements.

25. The computer of claim 22, wherein the product index further includes a weight value for each association of a particular product to a portion of the received purchasing data, wherein each weight value defines a relative accuracy of the corresponding association, and wherein the processor is further configured to:

determine, from the product index, products associated with a portion of the received purchasing data; and identify the product related to the transaction based on the weight values of the products determined from the product index.

26. The computer of claim 25, wherein the processor is further configured to:

identify the product related to the transaction by selecting the product having the highest weight value.

27. The computer of claim 25, wherein the processor is further configured to:
   update the weight values based on an accuracy determination of the corresponding associations.

28. The computer of claim 22, wherein the processor is further configured to:
   compare the received purchasing data with product information stored in a plurality of product indexes, wherein each product index associates different portions of the received purchasing data with products; and
   identify the product related to the transaction based on the comparisons with the product information in each of the plurality of product indexes.

29. The computer of claim 28, wherein each of the product indexes includes a weight value for each association of a particular product to a portion of the received purchasing data, wherein each weight value defines a relative accuracy of the corresponding association, and wherein the processor is further configured to:
   determine, from the product indexes, products associated with a portion of the received purchasing data; and
   identify the product related to the transaction based on the weight values of the products determined from the product indexes.

30. The computer of claim 29, wherein the processor is further configured to:
   combine the weight values for each determined product from each product index; and
   identify the product related to the transaction by selecting the product having the highest combined weight value.

31. The computer of claim 22, wherein the processor is further configured to:
   identify, for each transaction, a supplier associated with the particular transaction;
   modify the received purchasing data to include data representing the identified supplier; and
   process the modified purchasing data to reflect all purchase transactions concerning the identified supplier.

32. The computer of claim 31, wherein the processor is further configured to:
   identify, for each transaction, a supplier associated with the transaction by comparing the received purchasing data with supplier identification information stored in a supplier database.

33. The computer of claim 32, wherein the processor is further configured to:
   update the supplier database with new supplier identification information about suppliers contained in the received purchasing data.

34. The computer of claim 33, wherein the processor is further configured to:
   compare the received purchasing data with supplier identification information to determine a match based on at least one of the following matching criteria: (1) an exact match between a portion of the received purchasing data with the supplier identification information; or (2) a match of a predetermined portion of the received purchasing data with the supplier identification information.

35. The computer of claim 34, wherein the processor is further configured to determine a match based on at least one of the following supplier matching criteria: (1) a name of a supplier; (2) an acronym formed from a supplier's name; (3) an address or a portion of an address of a supplier; (4) a telephone or facsimile number of a supplier; or (5) an identification number assigned to a supplier.

36. The computer of claim 35, wherein the processor is further configured to use a plurality of the supplier matching criteria to determine a match.

37. The computer of claim 31, wherein the processor is further configured to:
   assign a supplier identification code corresponding to the identified supplier of each transaction; and
   sort the transactions according to the assigned supplier identification code.

38. The computer of claim 22, wherein the processor is further configured to:
   analyze the modified purchasing data to summarize purchasing activity of the purchasing entity.

39. The computer of claim 22, wherein the product index associates products with information on suppliers included in the received purchasing data.

40. The computer of claim 22, wherein the product index associates products with textual information included in the received purchasing data.

41. The computer of claim 22, wherein the product index associates products with an identification code included in the received purchasing data.

42. The computer of claim 22, wherein the processor is further configured to:
   negotiate for purchases based on the processed modified purchasing data.

43. A computer-implemented system for processing purchasing data, the system comprising:
   means for receiving purchasing data, from a purchasing entity that is a member of a purchasing group, wherein the purchasing data relates to accounting data associated with purchase transactions purchased by the purchasing entity;
   means for creating a data structure for the purchasing data, including creating a first data structure for entity-level purchasing data and creating a second data structure for group-level purchasing data related to the purchasing group;
   computer means for identifying, for each transaction, a product related to the transaction by comparing the received purchasing data with product information stored in a product index, wherein the product information in the product index associates at least a portion of the received purchasing data with a particular product;
   means for modifying the received purchasing data in the data structure to include data representing the identified product; and
   means for processing the modified purchasing data to reflect all purchase transactions concerning the identified product.

44. The system of claim 43, wherein the receiving means further includes:
   means for determining whether the received purchasing data complies with predetermined purchasing data criteria defining data expected from the purchasing entity.

45. The system of claim 43, wherein the receiving means further includes:
   means for formatting the received purchasing data to comply with predetermined data storage requirements.

46. The system of claim 43, wherein the product index further includes a weight value for each association of a particular product to a portion of the received purchasing data, wherein each weight value defines a relative accuracy of the corresponding association, and wherein the product identifying means further includes:

means for determining, from the product index, products associated with a portion of the received purchasing data; and means for identifying the product related to the transaction based on the weight values of the products determined from the product index.

47. The system of claim 46, wherein the computer means for identifying the product based on the weight values further includes:

means for identifying the product related to the transaction by selecting the product having the highest weight value.

48. The system of claim 46, wherein the system further includes:

means for updating the weight values based on an accuracy determination of the corresponding associations.

49. The system of claim 43, wherein the product identifying means further includes:

means for comparing the received purchasing data with product information stored in a plurality of product indexes, wherein each product index associates different portions of the received purchasing data with products; and means for identifying the product related to the transaction based on the comparisons with the product information in each of the plurality of product indexes.

50. The system of claim 49, wherein each of the product indexes includes a weight value for each association of a particular product to a portion of the received purchasing data, wherein each weight value defines a relative accuracy of the corresponding association, and wherein the identifying means further includes:

means for determining, from the product indexes, products associated with a portion of the received purchasing data; and means for identifying the product related to the transaction based on the weight values of the products determined from the product indexes.

51. The system of claim 50, wherein the means for identifying the product based on the weight values further includes:

means for combining the weight values for each determined product from each product index; and means for identifying the product related to the transaction by selecting the product having the highest combined weight value.

52. The system of claim 43, further comprising:

means for identifying, for each transaction, a supplier associated with the particular transaction;

means for modifying the received purchasing data to include data representing the identified supplier; and means for processing the modified purchasing data to reflect all purchase transactions concerning the identified supplier.

53. The system of claim 52, wherein the means for identifying a supplier further includes means for identifying, for each transaction, a supplier associated with the transaction by comparing the received purchasing data with supplier identification information stored in a supplier database.

54. The system of claim 53, wherein the system further includes:

means for updating the supplier database with new supplier identification information about suppliers contained in the received purchasing data.

55. The system of claim 53, wherein the supplier identifying means further includes:

means for comparing the received purchasing data with supplier identification information to determine a match based on at least one of the following matching criteria:

(1) an exact match between a portion of the received purchasing data with the supplier identification information; or (2) a match of a predetermined portion of the received purchasing data with the supplier identification information.

56. The system of claim 55, wherein the means for comparing the purchasing data includes means for determining a match based on at least one of the following supplier matching criteria: (1) a name of a supplier; (2) an acronym formed from a supplier's name; (3) an address or a portion of an address of a supplier; (4) a telephone or facsimile number of a supplier; or (5) an identification number assigned to a supplier.

57. The system of claim 56, wherein a plurality of the supplier matching criteria may be used to determine a match.

58. The system of claim 52, wherein the means for identifying a supplier further includes:

means for assigning a supplier identification code corresponding to the identified supplier of each transaction; and wherein the means for processing the modified purchasing data further includes means for sorting the transactions according to the assigned supplier identification code.

59. The system of claim 43, wherein the means for processing the modified purchasing data further includes:

means for analyzing the modified purchasing data to summarize purchasing activity of the purchasing entity.

60. The system of claim 43, wherein the product index associates products with information on suppliers included in the received purchasing data.

61. The system of claim 43, wherein the product index associates products with textual information included in the received purchasing data.

62. The system of claim 43, wherein the product index associates products with an identification code included in the received purchasing data.

63. The system of claim 43, wherein the system further includes:

means for negotiating for purchases based on the processed modified purchasing data.

64. The method of claim 1, wherein the purchasing data contains general ledger account information.

65. The method of claim 1, wherein the purchasing data includes aggregate purchasing data reflecting aggregate purchase transactions of the purchasing group.

66. A computer-implemented method for processing purchasing data, the method comprising:

receiving purchasing data from a purchasing entity that is a member of a purchasing group, wherein the purchasing data relates to general ledger account information associated with purchase transactions made by the purchasing entity;

creating a data structure to store the received purchasing data, including creating a first data structure for entity-level purchasing data and creating a second data structure for group-level purchasing data related to the purchasing group;

using a computer to identify, for each transaction, a product related to the transaction by comparing the received purchasing data with product information stored in a product index, wherein the product information in the product index associates at least a portion of the received purchasing data with a particular product;

modifying the received purchasing data to include data representing the identified product; and processing the modified purchasing data to reflect all purchase transactions concerning the identified product.

67. A computer-implemented method for processing purchasing data, the method comprising:

receiving purchasing data from a purchasing entity, wherein the purchasing entity is a member of a purchasing group, and wherein the purchasing data includes aggregate purchasing data reflecting aggregate purchase transactions of the purchasing group;

creating a data structure to store the received purchasing data, including creating a first data structure for entity-level purchasing data and creating a second data structure for group-level purchasing data related to the purchasing group;

using a computer to identify, for each transaction, a product related to the transaction by comparing the received purchasing data with product information stored in a product index, wherein the product information in the product index associates at least a portion of the received purchasing data with a particular product;

modifying the received purchasing data to include data representing the identified product; and processing the modified purchasing data to reflect all purchase transactions concerning the identified product.

* * * * *